United States Patent [19]

Ostermiller

[11] Patent Number: 5,003,316
[45] Date of Patent: Mar. 26, 1991

[54] SINGLE NULL MINIATURE DIRECTION FINDER

[75] Inventor: Dirk H. Ostermiller, Salt Lake City, Utah

[73] Assignee: E-Systems, Inc., Dallas, Tex.

[21] Appl. No.: 342,325

[22] Filed: Apr. 24, 1989

[51] Int. Cl.⁵ ............................................. G01S 5/02
[52] U.S. Cl. .................................. 342/429; 342/419
[58] Field of Search ............... 342/419, 422, 423, 428, 342/429, 448

[56] References Cited

U.S. PATENT DOCUMENTS

| | | |
|---|---|---|
| 2,279,466 | 4/1942 | Johnski et al. |
| 2,368,921 | 2/1945 | Greene et al. |
| 2,388,262 | 11/1945 | Ganiayre et al. |
| 2,465,381 | 3/1949 | Libby |
| 2,475,975 | 7/1949 | McCarthy et al. |
| 2,477,434 | 7/1949 | Wirkler |
| 2,513,485 | 7/1950 | Herrick |
| 2,958,867 | 11/1960 | Colvin et al. |
| 2,975,418 | 3/1961 | Himmel |
| 3,005,200 | 10/1961 | O'Meara |
| 3,093,827 | 6/1963 | Trarers |
| 3,106,710 | 10/1963 | Storer |
| 3,353,184 | 11/1967 | Kadron et al. |
| 3,611,386 | 10/1971 | Perper |
| 3,701,155 | 10/1972 | Adams |
| 3,747,107 | 7/1973 | Poppe et al. |
| 3,754,266 | 8/1973 | Poppe et al. |
| 3,774,216 | 11/1973 | Coleman et al. |
| 3,816,833 | 6/1974 | Ryan |
| 3,818,479 | 6/1974 | Ledbetter |
| 3,824,595 | 7/1974 | Hall |
| 3,916,411 | 10/1975 | Fiedler |
| 3,967,280 | 6/1976 | Mayer et al. |
| 4,003,060 | 1/1977 | Broce et al. |
| 4,121,216 | 10/1978 | Bruch et al. |
| 4,198,633 | 4/1980 | Krajewski |
| 4,307,402 | 12/1981 | Watanabe |
| 4,410,890 | 10/1983 | Daris et al. |
| 4,475,106 | 6/1984 | Andrews |
| 4,489,327 | 12/1984 | Eastwell |
| 4,528,566 | 7/1985 | Tyler |
| 4,724,442 | 2/1988 | King |

FOREIGN PATENT DOCUMENTS 1576616 10/1980 United Kingdom .

OTHER PUBLICATIONS

Giacoletto et al., Medium-Frequency Crossed Loop Radio Direction Finder with Instantaneous Unidirectional Visual Presentation (RCA Labs; 9/49).

Primary Examiner—Thomas H. Tarcza
Assistant Examiner—Mark Hellner
Attorney, Agent, or Firm—Harold E. Meier

[57] ABSTRACT

A single null miniature direction finder which may be worn on the arm of the user and is fully automatic in operation. Signals from a single loop antenna and a sense antenna are summed; however, the amplitude of the sense signal is adjusted at first and second phase angles and the phase of the sense antenna is automatically switched from the first phase angle to the second phase angle prior to summing to produce either a single null or a no null pattern. These patterns are compared to each other as the user extends his arm horizontally and rotates his body. When the null occurs an indicator gives the relative direction to the transmitter.

30 Claims, 2 Drawing Sheets

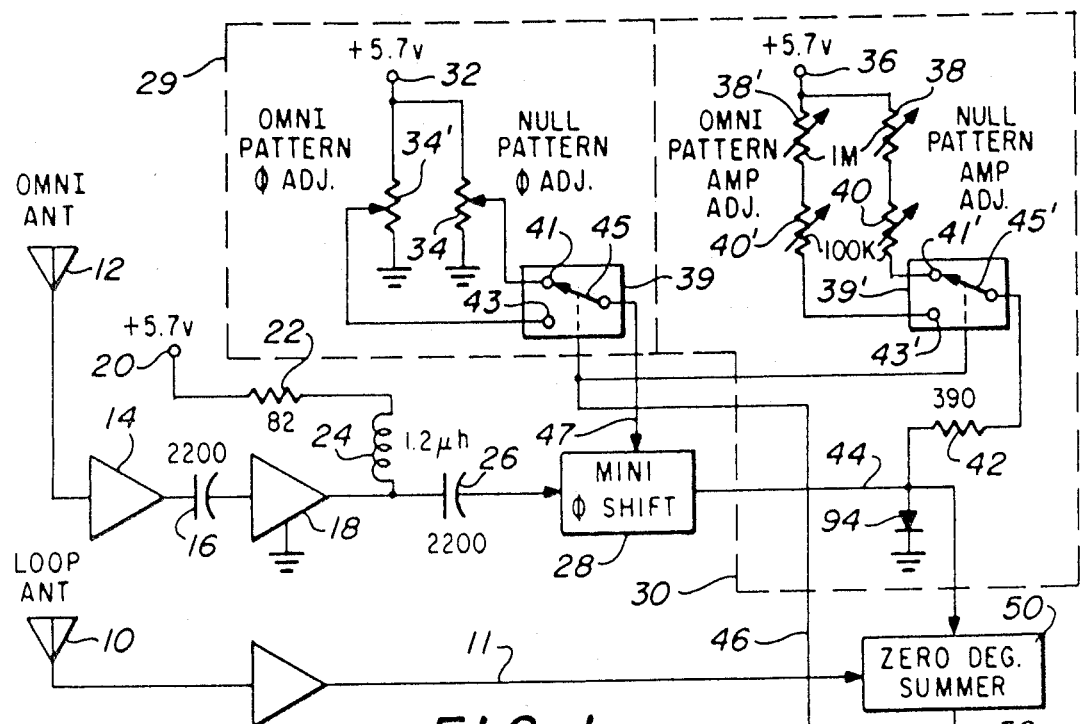
FIG. 1
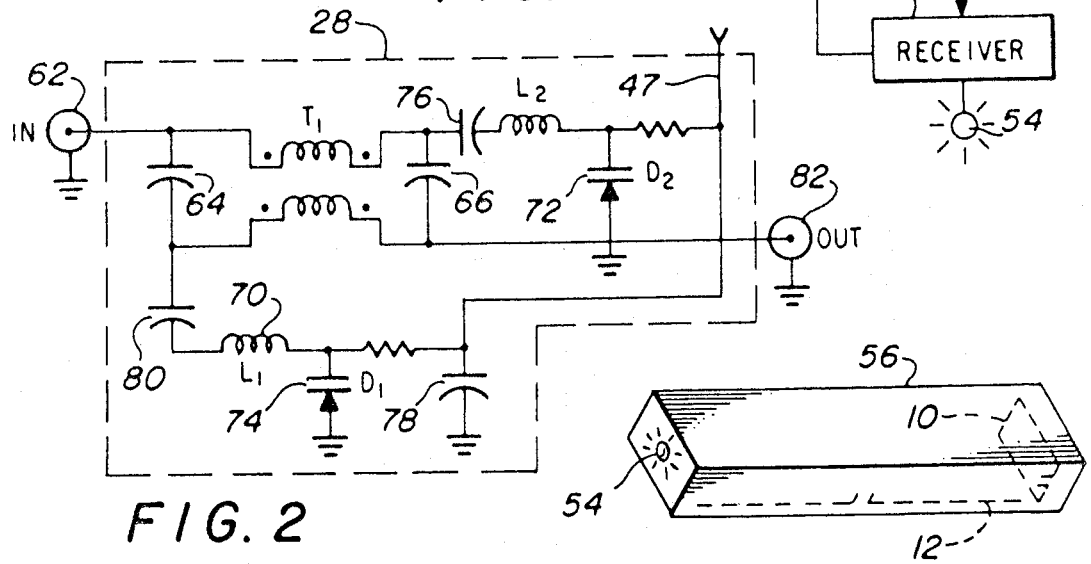
FIG. 2
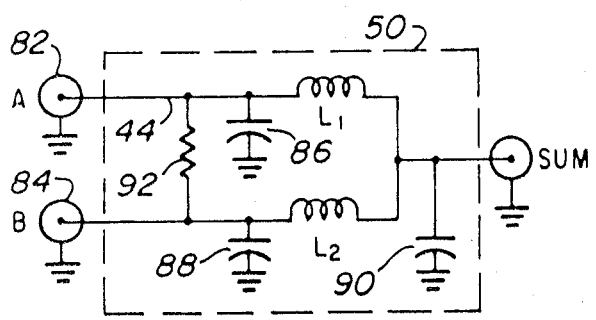
FIG. 3
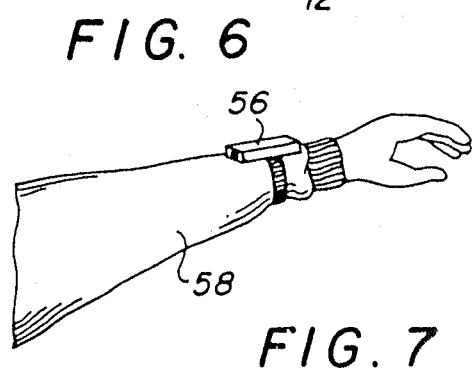
FIG. 6
FIG. 7

SINGLE NULL MINIATURE DIRECTION FINDER

FIELD OF THE INVENTION

The present invention relates to direction finders in general, and in particular, to miniaturized direction finders which may be worn on the arm of the operator.

BACKGROUND OF THE INVENTION

Direction finders are old and well known in the art and are used to determine the direction from which a transmitted signal is being received. The equipment varies in size, but it would be desirable to employ a small, wrist-worn direction finding receiver that would not interfere with the activities of the user. The size of such unit is limited by the circuitry and the size and spacing of the antennas required.

Such receivers in the past have used three antennae, two loops (a null antenna and a sense antenna) and an omnidirectional antenna. The signal from the null loop antenna mounted in the forward end of the receiver is compared with that of the sense loop antenna, which is mounted orthogonally, to determine that a null of some predetermined depth is being obtained. The phase of the omnidirectional antenna is compared with the phase of the sense loop antenna to determine which null is being encountered. If the relative phase is 0°, the direction lamp is illuminated. If the relative phase is 180°, the lamp is not illuminated.

This system depends upon having three antennae whose amplitude and phase characteristics are mutually independent from one another and are acceptable in the presence of the user. This means that the antennae must not be too close to one another or to the body of the user. Further, in the prior art, the omnidirectional or sense antenna must be mounted outside the receiver case in order to have sufficient spacing from the arm of the user and from the receiver to maintain an acceptable constant phase pattern. This presents an operational problem in that the omnidirectional antenna protrudes sufficiently to cause a hazard for the user. In addition, the omnidirectional antenna structure is subject to damage because of its protrusion from the receiver and has been one of the major causes of receiver failure.

Other direction finding techniques require antenna systems with large antennae, large spacings or both. Examples are dipoles that are spaced approximately ¼ wave length apart and switched arrays of similar antennae.

These systems are too large to be worn on the arm of an operator. They depend on antennae which have antenna patterns which are mutually independent, limiting the minimum spacing and size which may be obtained. In addition, the three antenna approach requires means for determining which null (forward or back) is being encountered by measuring relative phase. This means that additional circuitry is required.

The present invention overcomes the disadvantages of the prior art by its miniature size and uses only two antennae instead of three. Further, the location and size of the omnidirectional antenna are not critical, resulting in the ability to contain the antenna within the package and resulting in a much smaller receiver design. Operation is very simple, allowing the user to concentrate on other tasks at hand and allowing an unambiguous direction indication. The size and weight of the equipment described is less than one-half that of the known prior art and the circuitry is less complex. The equipment is contained in a small package measuring approximately 2.7×5×0.9 inches resulting in a volume of approximately 12 cubic inches. This package can be worn on the arm of a user and has no protruding antennae. Reliability of the equipment is enhanced since the protruding antenna that was subject to breakage is now contained within the receiver and is therefore protected.

Thus the present invention results in a reduction in size and complexity of a miniature direction finder system by eliminating the need for one of the null loop antennae and allowing the use of a less critical omnidirectional sense antenna. In addition, the overall circuitry required by the receiver is less complex.

Further, the receiver sensitivity of the present invention has been increased by the use of a more efficient electrically tuned loop antenna resulting in a decrease of the required transmitter power to obtain the same range performance.

The ability of the present invention to use only a single null loop antenna for direction finding is significant in that the physical volume of the receiver can be reduced to approximately one-half the physical volume of the prior art receivers. The cost of the receiver circuits are also less since no ambiguity circuits are required to determine which null is correct. Reliability of the receiver is enhanced because there is no external omnidirectional antenna and because critical phase adjustments required for correct operation of the ambiguity circuits are eliminated.

SUMMARY OF THE INVENTION

The present invention relates to a miniature direction finder to be worn on the arm of a user for indicating the direction of a transmitter comprising a null antenna for receiving a transmitter signal, an omnidirectional sense antenna for receiving the signal, means for combining the signals and for adjusting the relative amplitudes of the received signals at two different phase angles of the sense antenna signal to create the desired antenna patterns and to compensate for interaction between the null and sense antenna and nearby objects, including the body of the operator; means coupled to the phase shifting means for electrically shifting the phase of the sense antenna between first and second phase angles to cause the combined signal pattern to alternate between having a single null in a known direction relative to the transmitter and having no null and means for comparing the combined sense and null antenna signal pattern obtained at the first phase angle with the combined null and sense pattern signal obtained at the second phase angle to determine that a null of sufficient depth has been obtained to indicate that the direction finder is pointed in the proper direction relative to the transmitter.

The invention also relates to a method of locating a transmitted signal with a miniature direction finder to be worn on the arm of the user comprising the steps of receiving the transmitted signal with a null antenna and an omnidirectional sense antenna, combining the signals and adjusting the relative amplitudes of the received signals at two different phase angles of the sense antenna signal to create the desired antenna patterns and to compensate for interaction between the null antenna and the sense antenna and nearby objects, including the body of the operator, electrically switching the phase of the sense antenna between the two different phase angles to cause the combined signal pattern to alternate between a single null in a known direction relative to the transmitter and having no null and comparing the combined sense and null antenna signal pattern at a first phase angle with the combined null and sense pattern signal at the second phase angle to determine that a null of sufficient depth has been obtained to indicate that the direction finder is pointed in the proper direction relative to the transmitter.

BRIEF DESCRIPTION OF THE DRAWINGS

For a more complete understanding of the present invention and the advantages thereof, reference is now made to the following description taken in conjunction with the accompanying drawings in which:

FIG. 1 is a block diagram of the miniature direction finder antenna system;

FIG. 2 is a schematic drawing of the miniature phase shifter shown in FIG. 1;

FIG. 3 is a schematic diagram of the miniature 0° summer shown in FIG. 1;

FIG. 6 is a diagrammatic representation of the receiver package showing the antennae to be internally mounted; and FIG. 7 is a representation of an operator having the receiver package mounted on his arm and the arm extended in order to find the direction of the transmitter of a received signal.

DETAILED DESCRIPTION OF THE DRAWINGS

Figure 4:
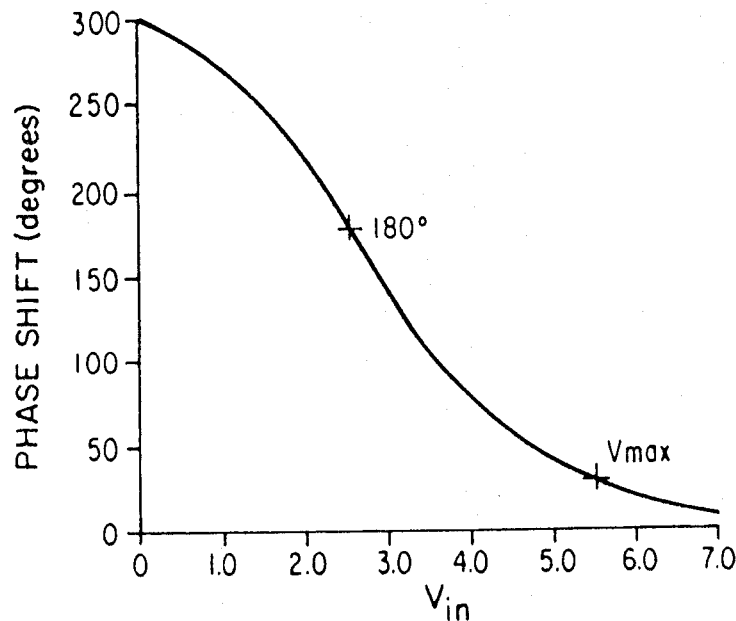
FIG. 4 is a plot of phase versus tuning voltage for the miniature phase shifter.

The single null miniature direction finding system uses two antennas, a ferrite loop antenna and an E-field sensing (omni) antenna such as a miniature dipole. These antennas mount in a small enclosure which may be fastened to the wrist of the operator's arm. In one embodiment the loop or null antenna is situated so that a null is obtained in the forward (toward the transmitter) and the reverse (away from the transmitter) directions. The omni antenna is also mounted in the small enclosure worn on the wrist of the operator. Proper operation of the direction finder depends on combining the signals from the two antennas so that a single null in the forward direction is obtained. This is done by adjusting the amplitude of the omni antenna signal at two different phase angles and alternately summing these signals with the null antenna output.

Since in this embodiment the loop or null antenna is oriented with the null in the forward direction (and reverse toward the operator), the antenna pattern of the loop antenna is relatively unaffected by reflections from the operator. The mutual coupling is also significantly less for the loop since it is magnetically coupled, and not electrically coupled. The omni or sense antenna, however, receives signals both by the direct path and also from reflections from the body of the operator. Since these reflected signals undergo a phase shift of 180 degrees at the body of the operator, the resultant signal is reduced when the operator is facing the transmitter. When facing away from the transmitter, the received signal (except for a slight shadowing effect) is relatively unaffected by reflections from the body of the operator. This results in a pattern for the omni antenna which receives less signal when facing the transmitter (0°).

When the amplitude of the omni antenna matches that of the loop and the phase differs by 180 degrees, cancellation of the resultant signal occurs and the net effect is a null which is shifted somewhat from the original null of the loop antenna alone. The amount of shift depends on the relative strength of the signal from the omnidirectional antenna; a larger signal corresponds to a larger shift, since more signal from the loop is required for cancellation. Since the response of the omni is substantially greater than the null antenna in the reverse direction, the signal from the sense or omni is always greater than that of the null or loop and complete cancellation does not occur when facing away from the transmitter. If the phase of the omni signal is changed so that it is not near 180 degrees relative to the loop antenna where the signals are approximately the same amplitude, no cancellation exists in the forward direction, and the overall antenna pattern has no nulls at all. Operation of the single null antenna system is obtained by rapidly changing the amplitude of the omni at two different phase angles and comparing the combined signal with and without a null. If a difference in amplitude exists which is greater than a predetermined amount, the receiver—with a possible known offset—is pointed at the transmitter.

It can be seen that the overall effect of combining signals received by the direct path and those from a reflecting surface (the body of the user) can be made to have a single null or have no null depending on the relative phase and amplitude between the omni and the null signals. This allows for a unique determination of direction to the transmitter with a relatively simple array of two antennas which are electrically very small and close to one another. Rather than causing problems with a distorted antenna pattern, the signal reflected from the body of the operator is used to advantage to create a single unambiguous null.

In another embodiment, the loop or null antenna is situated in the package or enclosure so that the nulls in the pattern are obtained at an angle of 90° with respect to the direction in which the transmitted signals are received. This requires the arm of the user to be extended at an angle of 90° with respect to the front of the user's body. Since the signals are reflected from the body of the user essentially only in the forward direction or at 0°, the receiver on the arm extended to the side (at 90° with respect to the front of the body) will receive little or none of the body reflected signals. However, in this orientation of the loop antenna, the nulls are at an angle of 90° with respect to the direction in which the transmitted signals are received, and, thus, the loop or null antenna will receive the signals at maximum strength. This makes the direction finder much more sensitive to the reception of the transmitted signals. In other respects, the adjustments are made as indicated previously.

It is possible, of course, to position the loop antenna in the package to cause a null in the loop antenna signal pattern when the arm of the user is extended at any predetermined angle between 0° and 90° with respect to the transmitter direction from the user. However, it would be more difficult, if the angle is not at 0° or 90°, for the operator to determine with accuracy the direction of the transmitter. Again, the adjustments would be made as indicated previously.

FIG. 1 is a schematic representation of the miniature direction finder which is to be mounted on the arm of the user. The signal from the small, single loop or null antenna 10 is combined with the signal from the omnidirectional or sense antenna 12 to form a combined pattern having the shape of a cardioid with a single null. The loop antenna 10, by itself, has the well known double null pattern with a null in both the forward and reverse directions. In order to achieve the single null, the phase and amplitude of the omnidirectional antenna 12 must be adjusted correctly based on the distance between the two antennae and interaction between the two antennae and the body of the user.

The signal from the omnidirectional antenna 12 is amplified at 14 and the output coupled through capacitor 16 to amplifier 18. A bias voltage 20 is coupled through a resistor 22 and coil 24 to the input of amplifier 18. The output of amplifier 18 is coupled through capacitor 26 to a miniature phase shift circuit 28.

The phase shift circuit 28 is used to correct a problem inherent in building a small direction finding receiver. That problem is the interaction between antennae and the problem is enhanced by the low gain obtainable by very small antennae and the proximity of relatively large masses, including the body of the operator, and other surrounding objects to the receiver. Thus, miniphase shift circuit 28 in conjunction with the phase shift adjusting circuit 29 and the amplitude adjusting circuit 30 are used to adjust the amplitude of the omnidirectional signal at two different phase positions or angles before it is summed with the loop or null antenna signal so that the desired antenna characteristics may be obtained in spite of the disturbances. A voltage from source 32 is applied through a variable voltage divider 34, contact 41 and contact arm 45 of FET 39 to the miniature phase shift circuit 28 for adjusting the phase of the sense signal to a first angle to cause a null in the combined antenna pattern as observed at the receiver 48. Once this first phase shift adjustment is made, the amplitude of the combined signal is also adjusted with circuit 30. A voltage source 36 is coupled through a coarse adjustment resistor 38, a fine adjustment resistor 40, contact 41' and contact arm 45' of FET 39' and a fixed resistor 42 to the output 44 of the mini-phase shift circuit 28. Again, this initial phase shift adjustment and amplitude adjustment is made to compensate for the low gain obtainable by the small antennae in the proximity of relatively large masses due to the receiver and other surrounding objects. The pin diode 94 in FIG. 1 is an attenuator that is used in conjunction with the amplitude control circuit 30 to control the amplitude of the omnidirectional signal and provide a broadband 50-ohm source termination for the phase shifter 28.

After the initial phase and amplitude adjustments have been made, the phase of the omnidirectional antenna is switched electrically by FET 39 to a second angle (where there is no null in the combined antenna pattern as observed at the receiver 48) by a square wave signal on line 46 from receiver 48 that switches the contact arm 45 of FET 39 from terminal 41 to terminal 43. Voltage divider 34' is adjusted to set the phase of the sense antenna signal at a second angle where there is no null in the combined antenna pattern signal as observed at the receiver 48. At the same time, the square wave on line 46 causes contact arm 45' of FET 39' to switch electrically from contact 41' to contact 43'. The sense signal amplitude is again adjusted at the new phase angle with resistors 38' and 40' to the proper amplitude. Once the signal is adjusted at the two different phase angles, the square wave signal on line 46 causes the omni antenna pattern to alternate between having a simple null in the direction of the transmitter and having no null at all. Each of these patterns is combined with the null antenna signal pattern in summer 50. The difference in the signal strength between the two alternating combined patterns as observed at receiver 48 determines when a null of sufficient depth has been achieved to indicate that the receiver is pointed at the transmitter. The combined null antenna signal and the sense antenna signal at the first phase angle at the output of zero degree summer 50 is thereby compared with the combined null and sense antenna signals at the second phase angle in receiver 48. Thus, the combined signal is compared against itself, with and without a null, making actual antenna gains non-critical. If the combined loop and omnidirectional antenna pattern were compared directly with the omnidirectional antenna pattern, careful gain matching and gain tracking over temperature and frequency would be necessary and the amplitude adjustment required to obtain the necessary single null would not be available. The output of the summer 50 on line 52 is coupled to the receiver 48 which functions in a well known manner to cause a light 54 to be lit when the arm of the user, and thus the receiver, is pointed in a known direction relative to the transmitter.

During operation, the receiver package 56 (shown in FIGS. 6 and 7), containing the entire circuitry shown in FIG. 1 including the two antennae, is worn on the arm 58 of the user as shown in FIG. 7 and the user extends his arm parallel with the ground and turns around in a circle until a direction indicating lamp 54, shown in FIG. 6, is illuminated. This indicates that the user's arm is pointing in a known direction with respect to the transmitter.

The schematic of the miniature phase shifter 28 is shown in FIG. 2. The signal from coupling capacitor 26 in FIG. 1 is coupled to input terminal 62 in FIG. 2. The phase shifter 28 requires a quadrature hybrid power divider and varactor diodes. The quadrature hybrid uses a Micrometals T12-10 ferrite core to form transformer T1 which has an outside diameter of 0.125 inches. Also included are two 27 pf chip capacitors 64 and 66. The loss in the hybrid is less than 0.2 dB with a phase error of less than 2.5° over the frequency of interest. The phase shifter is completed with the addition of two inductors 68 and 70 also on T12-10 cores and two varactor diodes 72 and 74 and capacitors 76, 78 and 80. The entire circuit is contained on less than 0.25 square inches of printed circuit board. The output is obtained at terminal 82. The variable phase shift is obtained with the input on line 47 from the phase shift adjusting circuit 29.

FIG. 4 is a graph of phase versus tuning voltage for the phase shifter 28 of FIG. 2. As can be seen in FIG. 4, more than 250° of phase shift can be obtained with a tuning voltage range of 5.5 volts. Loss is less than 0.75 dB maximum and input and output VSWR is less than 1.5 over the entire tuning voltage range. The coils 68 and 70 are 19 turns of #34 AWG on T12-10 ferrite core. Each has a value of 530 nhy. The transformer T1 has nine turns of #28 AWG bifilar on a T12-10 ferrite core and has a value of 121 nhy. The two varactor diodes 72 and 74 may be of the type DKV 6533C with a value of 10-17 pf.

The phase and amplitude controlled output signal at terminal 82 in FIG. 2 must be summed with the loop antenna signal on line 11 to complete the system. The 0° hybrid summer 50 is shown in detail in FIG. 3. The summer 50 uses two additional T12-10 inductors L-1 and L-2, three chip capacitors 86, 88 and 90 and resistor 92. The signal from the omnidirectional antenna from terminal 82 on line 44, which is adjusted in amplitude at two different phase angles, is alternately coupled as one input to the zero degree summer 50 while the output from the single null or loop antenna 10 on line 11 to terminal 84 is the other input. The zero degree summer 50 has a measured loss of less than 0.15 dB and more than 28 dB of isolation. Input and output VSWR is less than 1.2. The circuitry of the miniature 0° summer requires less than 0.15 square inches of printed circuit area.

Proper operation of the phase and amplitude control circuits is checked by installing the circuits in a functional receiver and checking for proper operation as the amplitude of the omnidirectional antenna signal is adjusted at two different phases and then combined with the null antenna signal to obtain a signal pattern with a single null or a pattern with no null.

Figure 5:
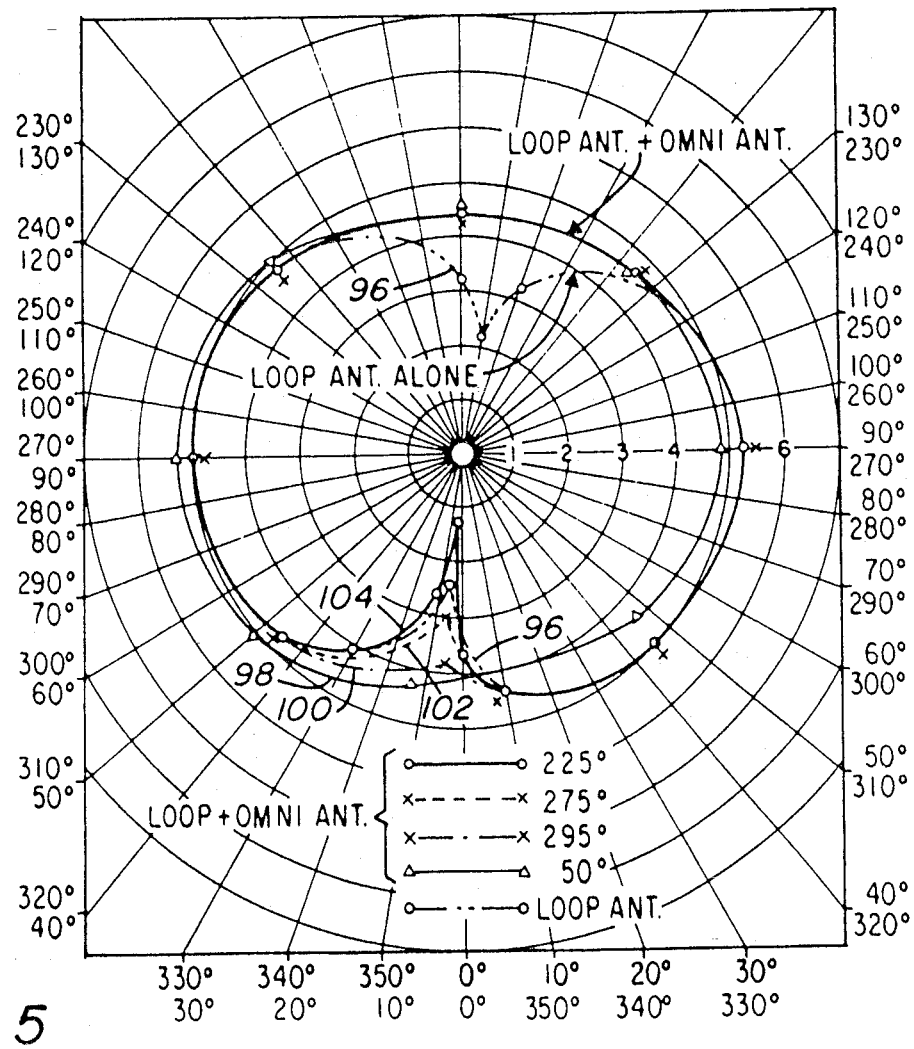
FIG. 5 is a graph of the single null antenna pattern as a function of phase shift.

FIG. 5 illustrates a plot of the combined null and omnidirectional antenna patterns as a function of the phase adjustment for the amplitude setting which gives the best performance. As can be seen, it is possible to achieve a single null approximately 40 dB at the deepest point when the phase adjustment is correct. A plot 96 of the null antenna alone is shown in FIG. 5 illustrating the expected null in both forward and reverse directions. Plot 98 in FIG. 5 illustrates the plot of the combined signals with 50° phase shift of the sense antenna signal, plot 100 illustrates the combined signals with a sense signal phase shift of 295°, plot 102 illustrates the combined signals with a sense signal phase shift of 275°, and plot 104 illustrates the deepest notch with a sense signal phase shift of 225°.

FIG. 6 illustrates in a diagrammatic fashion, a package 56 which contains the entire circuitry of the miniaturized direction finder including the single null or loop antenna 10 and the omnidirectional antenna 12. The positions of the loop antenna 10 and the omnidirectional 12 as shown in FIG. 6 are for illustrative purposes only. The locations of these antennae may be varied and the phase readjusted as indicated for best performance. However, the loop antenna must be positioned and/or adjusted with the nulls in the pattern occurring toward the transmitter so that it is unaffected by signal reflections from the body of the user when the arm of the user indicates the direction of the transmitter by pointing at it.

If the arm of the user is to be extended at right angles to the direction of the signal being received from the transmitter, as in another embodiment, then the loop antenna can be positioned or oriented in the receiver package so that the two nulls in the pattern are at right angles to the transmitter, thereby enabling the loop antenna to have much greater sensitivity to the transmitter signals in the forward direction (with respect to the front of the body of the user). Further, while the omnidirectional antenna of the prior art is made of blades from steel shimstock, wires were substituted and it was found that the wires could be shortened or bent into other configurations so long as, in each case, the sense signal amplitude was readjusted at the first and second phase angles for best performance. Thus, it was found that wires worked as well as blades and that, furthermore, the shape of the wires was not critical in that a single null could be obtained with the proper adjustment of the sense signal amplitude at the first and second phase angles for a number of different antenna shapes. Thus, there has been disclosed a single null miniature direction finder which allows a very small direction finding system to be realized which not only may be worn on the wrist of the user, but is also fully automatic in operation. This is accomplished by summing the signals from a single loop or null antenna and an omnidirectional or sense antenna while automatically switching the phase of the omnidirectional antenna to produce either a single null or an omnidirectional pattern. These patterns are compared to each other to determine the direction of the null relative to the direction to the transmitter.

While the invention has been described in connection with a preferred embodiment, it is not intended to limit the scope of the invention to the particular form set forth, but, on the contrary, it is intended to cover such alternatives, modifications and equivalents as may be included within the spirit and scope of the invention as defined in the appended claims.

I claim:

1. A miniature direction finder for indicating the direction of a transmitter comprising:
   a null antenna on said finder for receiving a transmitted signal;
   a sense antenna on said finder for receiving the transmitted signal;
   a phase shifter coupled to said sense antenna;
   means coupled to the phase shifter for adjusting the phase of the sense antenna signal to first and second phase angles;
   first means coupled to the output of the phase shifter for adjusting the amplitude of the sense signal at said first phase angle and combining the adjusted sense signal at the first phase angle with the null antenna signal to obtain a first combined signal pattern; and
   second means coupled to the output of the phase shifter for adjusting the amplitude of the sense signal at said second phase angle, combining the adjusted sense signal at the second phase signal with the null antenna signal to obtain a second combined signal pattern, and comparing the second combined signal pattern to the first combined signal pattern to indicate a known direction relative to the transmitter.

2. A miniature direction finder as in claim 1 wherein said combined sense antenna signal and null antenna signal forms said first pattern having the shape of a cardioid with a single null at the sense antenna signal first phase angle and a second pattern having no null at the sense antenna signal second phase angle.

3. A miniature direction finder as in claim 1 wherein said direction finder is contained within a package of miniature size sufficient to be worn on the wrist of the user.

4. A miniature direction finder as in claim 1 wherein said null antenna has a single loop.

5. A miniature direction finder as in claim 3 wherein, said null and said sense antennas are contained within said package so as not to protrude therefrom.

6. A miniature direction finder as in claim 3 wherein said sense antenna and said null antenna are formed from wire bent to conform to the shape of said package.

7. A miniature direction finder as in claim 3 wherein said package has a volume of no more than 12 cubic inches.

8. A miniature direction finder as in claim 5 wherein said antennae are so oriented in said package that the user, by extending his arm parallel to the ground surface and turning 360°, may determine the direction of the transmitter of said received signals relative to the user.

9. A miniature direction finder as in claim 8 further including a light for indicating when the transmitter direction has been determined.

10. A miniature direction finder for indicating the direction of a transmitter comprising:
a null antenna mounted in the direction finder so as to cause a null in the null antenna signal pattern when the direction finder is extended at a predetermined angle with respect to the transmitter direction;
a sense antenna in the direction finder for receiving a signal from the transmitter;
means for adjusting the phase of a sense antenna signal to a first angle with respect to the received null antenna signal;
means for adjusting the amplitude of the first phase adjusted sense antenna signal in the direction finder to match the amplitude of the null antenna signal to cause a null in the combined null antenna and sense antenna signal pattern when the direction finder is extended at said predetermined angle with respect to the transmitter direction;
means for adjusting the phase of the sense antenna signal to a second phase angle with respect to the null antenna signal;
means for adjusting the amplitude of the second phase adjusted sense signal such that no null occurs in the combined pattern regardless of the direction of orientation of the direction finder;
means for switching the phase of the sense antenna signal between the first and second phase angles at a predetermined rate; and
zero degree summer means for summing the switched sense antenna signal and the null antenna signal to obtain a signal pattern having a null at the first phase angle of sufficient depth to indicate when the direction finder is extended at said predetermined angle with respect to the transmitter direction.

11. The direction finder of claim 10 wherein said null antenna is mounted in the direction finder so as to cause a null in the null antenna signal pattern at the first phase angle when the direction finder is extended in the direction of the transmitter.

12. The direction finder of claim 10 wherein said null antenna is mounted in the direction finder so as to cause a null in the null antenna signal pattern at the first phase angle when the direction finder is extended at an angle of 90° with respect to the direction of the transmitter.

13. The direction finder of claim 10 wherein said null antenna is mounted in the direction finder so as to cause a null in the null antenna signal pattern at the first phase angle when the direction finder is extended at any selected angle between 0° and 90° with respect to the direction of the transmitter.

14. A miniature direction finder for indicating the direction of a transmitter from a receiver comprising:
a null antenna and a sense antenna in a receiver package;
means coupled to the sense antenna for adjusting the amplitude of a received sense signal at first and second phase angles to compensate for interaction between the null and sense antennas and nearby objects;
means coupled to said amplitude adjusting means for switching the phase of the signal between said first and second phase angles in an alternate manner;
means for summing the switched sense antenna signal and the null antenna signal to obtain a first pattern with no null and a second pattern with a single null; and
means for comparing said first and second patterns to determine when a null of sufficient depth is obtained to indicate the position of the transmitter in relation to the direction finder.

15. A method of indicating the direction of a signal transmitter from a receiver comprising the steps of:
mounting a null antenna and a sense antenna in a receiver package;
adjusting the amplitude of the signal received by the sense antenna at first and second phase angles to compensate for interaction between the null and sense antenna and nearby objects;
switching the amplitude adjusted sense antenna signal between said first and second phase angles to cause the sense antenna signal to alternate between a single null in the direction of the transmitter and no null;
summing the switched sense antenna signal and the null antenna signal to obtain a first signal pattern with no null and a second signal pattern having a single null in a known direction with respect to the transmitter; and
comparing said first and second patterns to determine when a null of sufficient depth is obtained to indicate the position of the direction finder relative to the transmitter.

16. A method as in claim 15 wherein said second pattern has the shape of a cardioid with a single null.

17. A method as in claim 15 further comprising the step of adjusting the amplitude of the sense antenna signal at said first and second phase angles before the signal is summed with the null antenna signal so that the desired null may be obtained regardless of the proximity of the sense antenna and null antenna to each other and to surrounding objects.

18. A method as in claim 15 further comprising the step of using a single loop as said null antenna.

19. A method as in claim 15 further comprising the step of containing said null and said sense antennae within said package such that they do not protrude from said package.

20. A method as in claim 19 further comprising the step of forming said sense and null antennae from wire bent to conform to the shape of said package.

21. A method as in claim 15 further comprising the step of forming said package with a volume of no more than 12 cubic inches.

22. A method as in claim 19 further comprising the step of orienting said antennae in said package such that the user, by extending his arm parallel to the ground surface and turning 360°, may determine the direction of the transmitter of said received signals relative to the user.

23. A method as in claim 15 further including the step of energizing a light on said package when the transmitter direction is determined.

24. A method of locating the direction of a transmitter with a miniature direction finder on the arm of the user comprising the steps of:
mounting a null antenna in the direction finder so as to cause a null in the null antenna signal pattern when the arm of the user is extended at a predetermined angle with respect to the transmitter direction from the user;

adjusting the amplitude of the signal received by a sense antenna in the direction finder with respect to the amplitude of the null antenna signal at a first angle 180° out of phase with the received null antenna signal to cause a null in the combined signal pattern when the arm of the user is extended at said predetermined angle with respect to the transmitter direction from the user;

adjusting the amplitude of the signal received by the sense antenna to match the amplitude of the null antenna signal at a second phase angle with respect to the null antenna signal such that no null occurs in the combined signal pattern regardless of the direction in which the arm of the user is pointed;

switching the phase of the sense signal between the first and second phase angles at a predetermined rate; and summing the switched sense antenna signal and the null antenna signal in a zero degree summer to obtain a null of predetermined depth when the arm of the user is extended at said predetermined angle with respect to the transmitter direction from the user.

25. The method of claim 23 wherein said null antenna is mounted in the direction finder so as to cause a null in the null antenna signal pattern when the arm of the user is pointed toward the transmitter.

26. The method of claim 23 wherein said null antenna is mounted in the direction finder so as to cause a null in the null antenna signal pattern when the arm of the user is extended at an angle of 90° with respect to the direction of the transmitter from the user.

27. The method of claim 23 wherein said null antenna is mounted in the direction finder so as to cause a null in the null antenna signal pattern when the arm of the user is extended at any selected angle between 0° and 90° with respect to the direction of the transmitter from the user.

28. A method of locating the direction of a transmitter using a miniature direction finder worn on the wrist of a user and having only a single sense antenna and a single null antenna comprising the steps of:
shifting the phase of the received sense signal to a first phase angle;
adjusting the amplitude of the shifted sense signal to obtain a signal pattern with no null when combined with the null antenna signal;
shifting the phase of the received sense signal to a second phase angle; and
adjusting the amplitude of the second shifted sense signal to obtain a signal pattern with a single null when combined with the null antenna signal, which single null indicates the position of the transmitter relative to the user.

29. The method of claim 28 further comprising the steps of:
measuring the difference in signal strength between the two combined antenna patterns as the user rotates his body and extended arm supporting the direction finder; and
activating a direction indicator when the difference in signal strength between the two combined antenna patterns reaches a predetermined level so as to indicate the direction of the transmitter relative to the user.

30. A method as in claim 29 wherein the direction indicator is a light that is illuminated when a null of predetermined depth is detected.

* * * * *

UNITED STATES PATENT AND TRADEMARK OFFICE
CERTIFICATE OF CORRECTION

PATENT NO. : 5,003,316

DATED : March 26, 1991

INVENTOR(S) : Dirk H. Ostermiller

It is certified that error appears in the above-identified patent and that said Letters Patent is hereby corrected as shown below:

Column 2, line 38, change "amPlitudes" to "amplitudes".
Column 2, line 43, change "couPled" to "coupled".
Column 7, line 67, after "shapes.", start new paragraph with "Thus".
Column 8, line 39, change "signal (2nd Occur) " to --angle--.
Column 9, line 15, after "first", insert --phase--.

Signed and Sealed this

Twelfth Day of January, 1993

Attest:

DOUGLAS B. COMER

*Attesting Officer*    Acting Commissioner of Patents and Trademarks